United States Patent [19]
Hoefkes

[11] 4,237,985
[45] Dec. 9, 1980

[54] TRACK REMOVING DEVICE

[75] Inventor: Heiner J. Hoefkes, Oakville, Canada

[73] Assignee: International Harvester Company, Chicago, Ill.

[21] Appl. No.: 48,417

[22] Filed: Jun. 14, 1979

[51] Int. Cl.³ .................... A01B 37/00; A01B 63/32
[52] U.S. Cl. .................................. 172/676; 172/460; 172/491
[58] Field of Search ............... 172/491, 463, 676, 505, 172/675, 497, 462, 500, 464, 473, 478, 474, 480, 479, 485, 452, 605, 488, 134, 126, 130, 132, 501, 494, 483

[56] References Cited

U.S. PATENT DOCUMENTS

| | | | |
|---|---|---|---|
| 1,422,967 | 7/1922 | Griswold | 172/175 |
| 1,887,348 | 11/1932 | Freeman | 172/134 |
| 2,675,752 | 4/1954 | Wangsgard | 172/463 |
| 3,021,908 | 2/1962 | Dlugosch | 172/501 |
| 3,314,386 | 4/1967 | Kopaska | 172/142 |
| 3,389,754 | 6/1968 | Allison | 172/484 |
| 3,528,507 | 9/1970 | Morkoski | 172/491 X |
| 3,993,413 | 11/1976 | Cox | 172/452 |
| 4,120,365 | 10/1978 | Kuhn | 172/676 |

*Primary Examiner*—Richard J. Johnson
*Attorney, Agent, or Firm*—James J. Getchius; Neal C. Johnson; F. David AuBuchon

[57] ABSTRACT

A device that includes a bracket, a hydraulic cylinder having an end pivotally mounted on an axis of the bracket, a first link pivotally mounted on the bracket on one side of the cylinder and pivotally connected to the extension end of the cylinder, a support structure pivotally mounted on the axis and having a plurality of earth working tools, and a second link pivotally mounted on the support structure on the other side of the cylinder and pivotally connected to the extension end of the cylinder. The device, including the bracket, is particularly arranged and constructed to be mounted on a multi-hitch structure for a plurality of grain drills to remove a tractor track prior to planting. The cylinder rotates the device from a working position to a transport position that is substantially in excess of 90° therefrom. Tool depth adjustment and levelling means are also provided.

10 Claims, 4 Drawing Figures

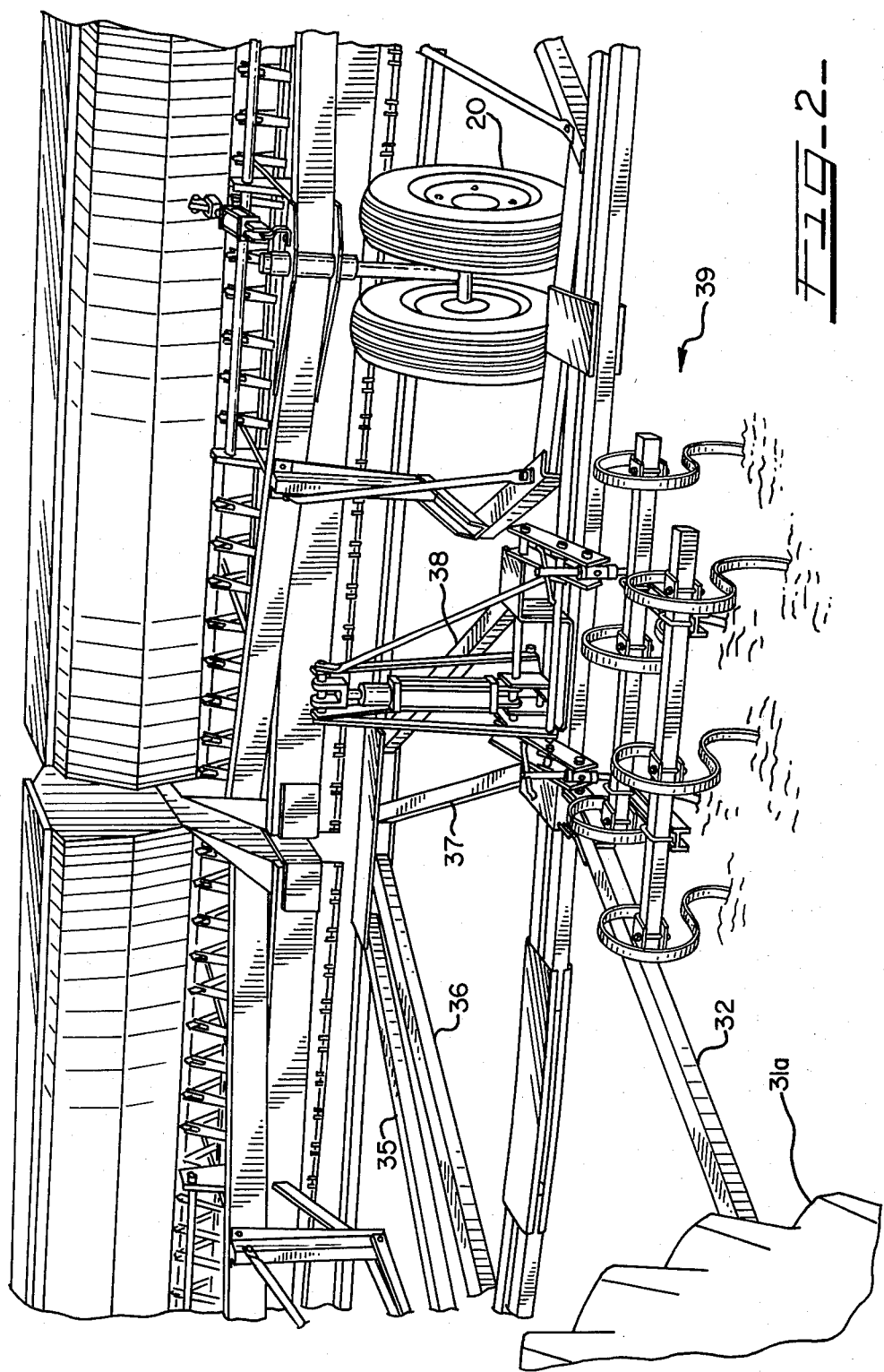

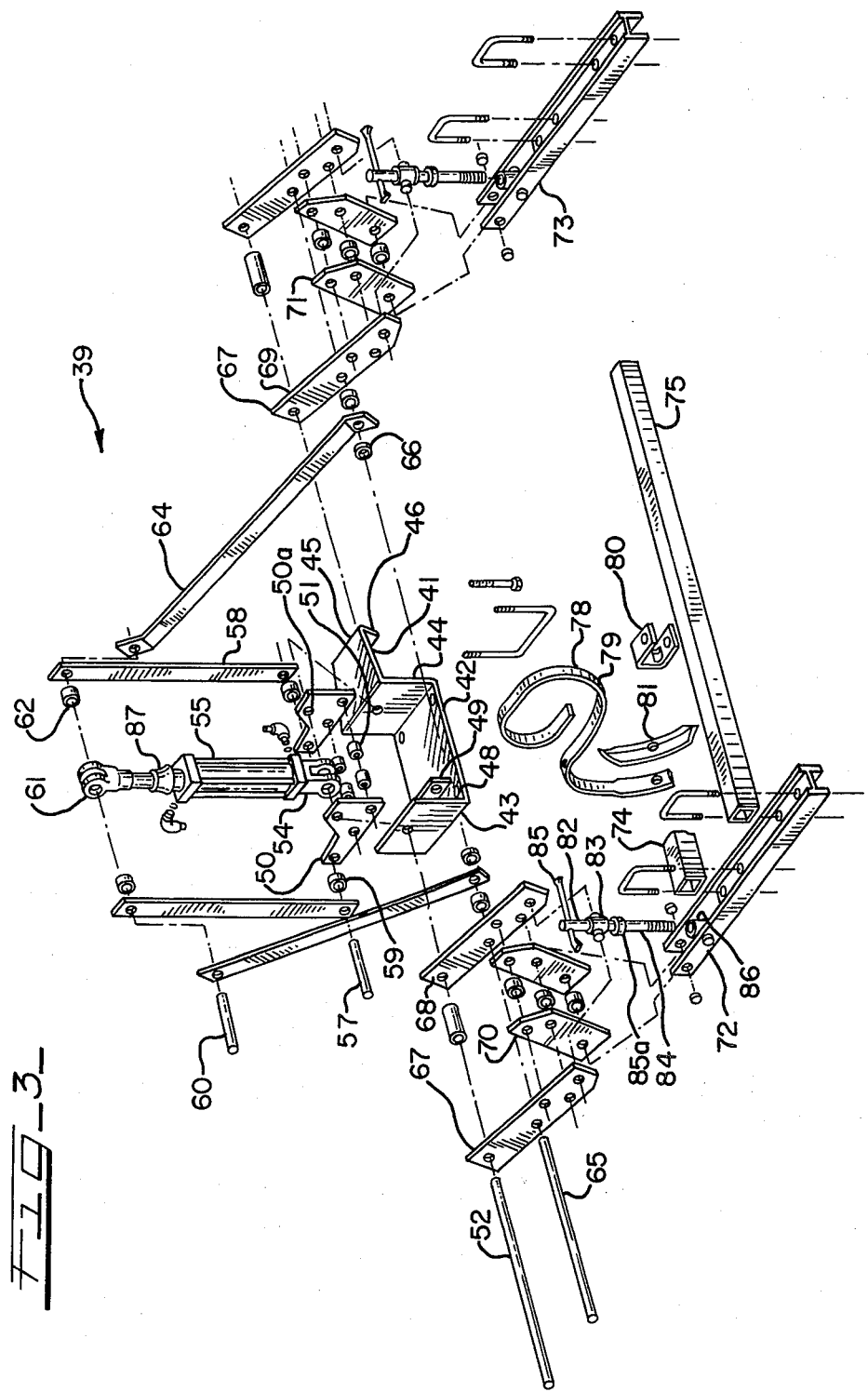

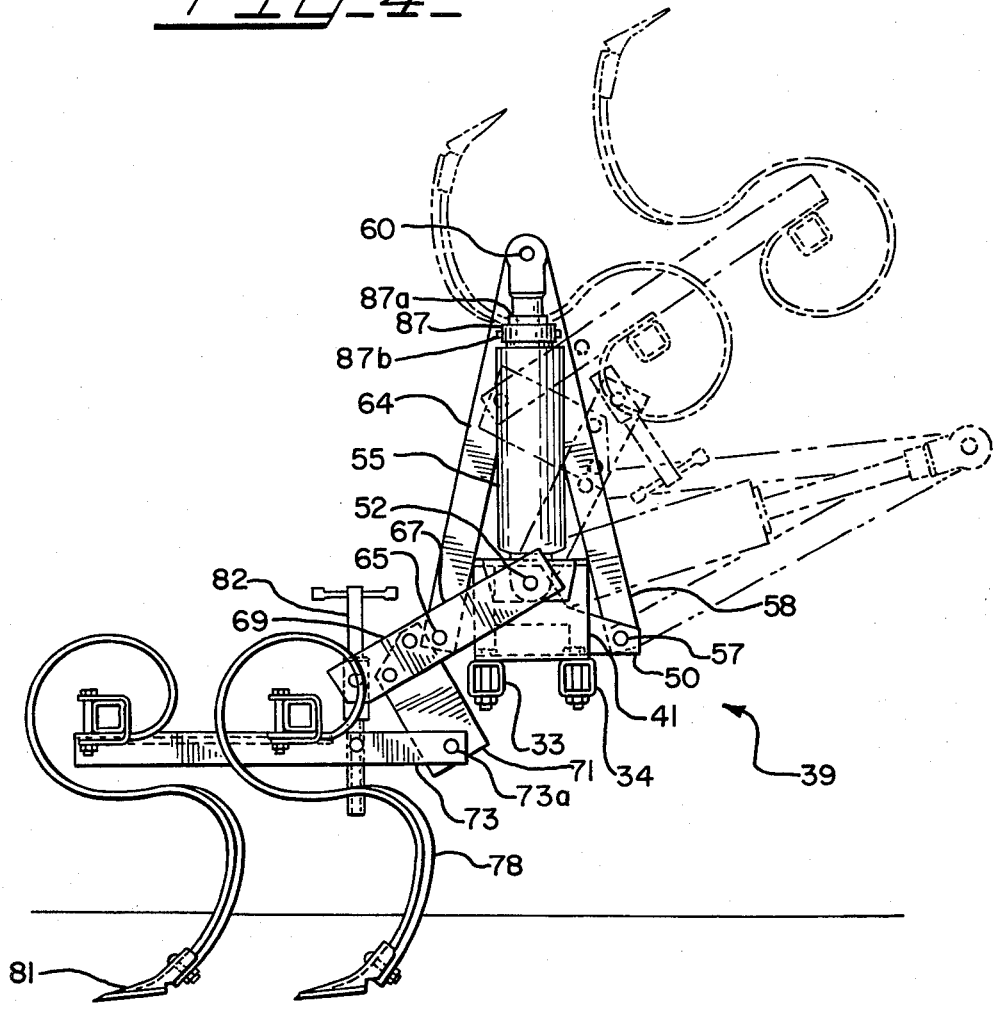

TRACK REMOVING DEVICE

BACKGROUND OF THE INVENTION

1. Field of the Invention

This invention pertains to track removing devices.

2. Description of the Prior Art

Track removing or erasing devices have been frequently utilized in the past. Generally, tractor tracks are objectionable because they provide water ways and packed ground conditions that retard plant growth. This is accentuated in multi-hitch grain drill arrangements that necessitate the use of large and heavy tractors. In the past, the devices were usually mounted on the tractor and movable from operating to transport positions by readily available mechanical structure. Inasmuch as the tractor can be used for a variety of tasks, the mounting and dismounting of the devices thereon, generally for planting, is unduly burdensome.

SUMMARY OF THE INVENTION

Applicant, as a consequence, designed a device that performs its needed function without the disadvantages of the prior art. Preferably, Applicant's device is mounted for remote operation rearward of each rearmost (single or dual) wheel of a tractor and forward of an implement which may be a grain drill. Since grain drills are commonly operated with four or five drills abreast and connected to the tractor by a multi-hitch arrangement, the device has to be mounted solely on the hitch which is usually constructed of rather light weight, hollow square bars that extend transverse to the tractor longitudinal centerline. Further, since multi-drill arrangements of this type are usually transported in train fashion by connecting the tractor to a secondary hitch at one end of a drill of the train, the multi-hitch tongue and track removing devices must be rotatable considerably more than 90° for narrow, safe transport. A hitch arrangement of this general type may be as shown in U.S. patent application Ser. No. 827,485 filed Aug. 25, 1977, now U.S. Pat. No. 4,157,735, ENDWISE TRANSPORT STRUCTURE FOR DRILLS by Nils O. Olsson and William Flood and assigned to subject Assignee. As shown in subject application, the castering wheels on the forward part of the drills and rear transport wheels, which are lowered for transport, provide the needed support structure for transport.

Applicant's device is readily mounted on a somewhat similar hitch structure and is rotatable approximately 145° rearwardly over the hitch structure with high clearance for end transport. If desired, the device could be utilized for 180° rotation. Also a tool depth and levelling adjustment is provided in the working position. The device is operable from the tractor seat by a suitable valve arrangement and besides being of a compact nature requires a minimum of structure.

It is, therefore, an object of this invention to provide a new and improved track removing device.

Another object of this invention is provide a device that is rotatable substantially in excess of 90° from the working to the transport position.

BRIEF DESCRIPTION OF THE DRAWINGS

FIG. 2 is a fragmentary perspective view of a unit embodying a track removing device with the device shown in the working position behind a tractor element;

FIG. 3 is an exploded view of the track removing device of this invention; and

FIG. 4 is a somewhat schematic side view showing the device in the working position in solid lines and in the transport position in broken lines.

DESCRIPTION OF THE PREFERRED EMBODIMENT

Figure 1:
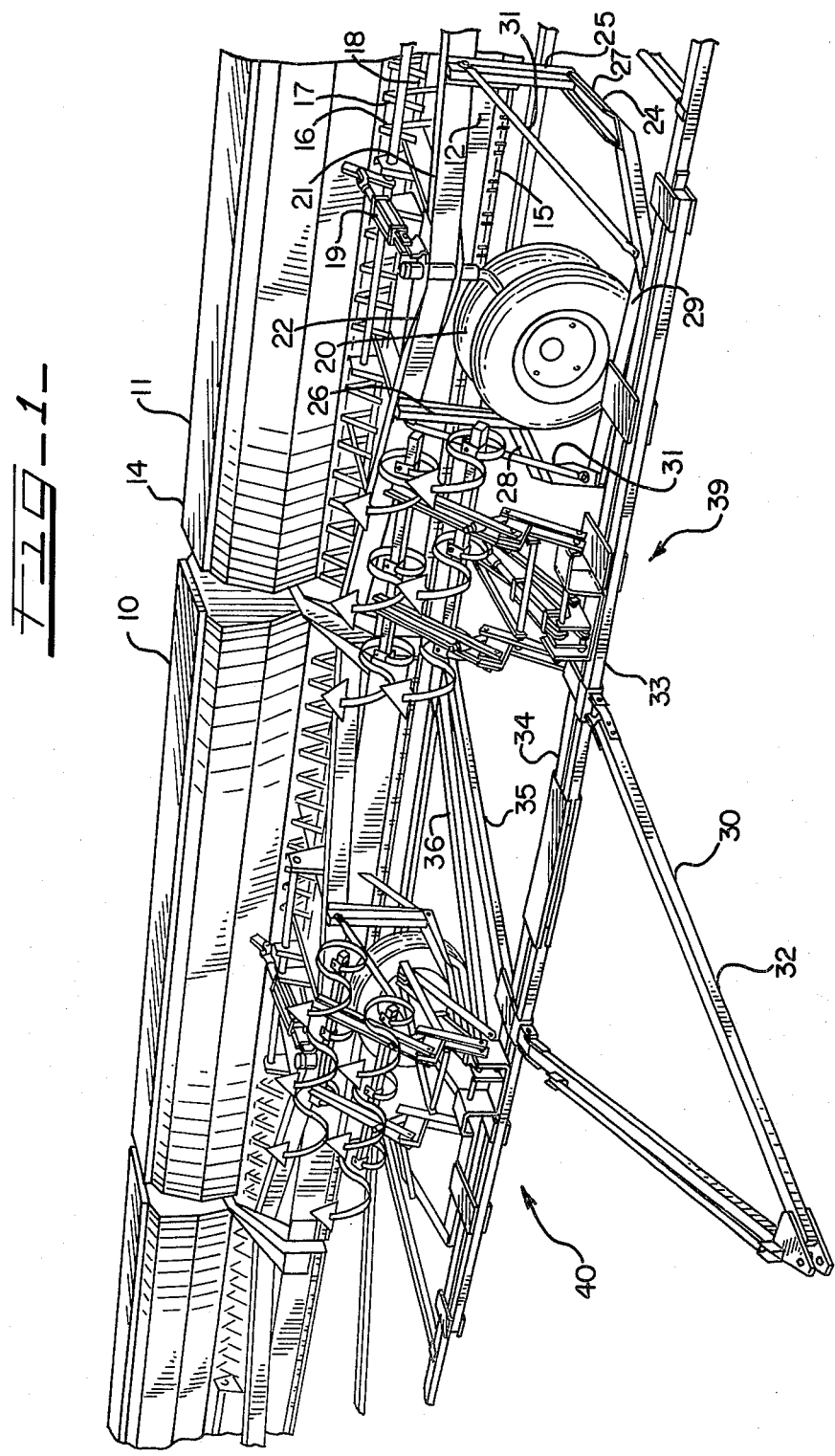
FIG. 1 is a front fragmentary perspective view of a four grain drill unit embodying the track removing devices of this invention with the devices shown in the transport position.

Referring to FIGS. 1 and 2, a four grain drill unit (three shown) that utilizes this invention is designated 10. Each grain drill, all of four of which are identical, (except for transport modifications and hitch elements) is denominated 11. Each drill 11 has a generally horizontally disposed framework 12 that supports an elongated hopper 14 for gravity feeding of seeds by a conventional dispenser to suitable ground opening and planting units (not shown) suspended from the front of the framework toward the tractor on a shaft 15 in trailing fashion by quick detachable drawbars. Adjustable, spring loaded rods 16 located rearward of shaft 15 and connected via lever 17 to rockshaft 18 force the openers into the soil. Hydraulic cylinder 19 by suitable linkages actuates the rockshaft to lift the openers. Rearward of each opener is a press wheel (not shown) that firms the soil around the seed deposited. Forward of each hopper are dual caster type wheels 20 mounted on beams 21 and 22 welded to framework 12. In the working or planting position the caster wheels and press wheels provide the necessary support for unit 10.

In transport, caster wheels 20 are aligned as shown in FIG. 1 for movement in the direction to the right side of the drawing by virtue of a secondary hitch located on the end of the leading drill (not shown). Special wheels are lowered that are located on the rear of the drills (not shown) to support the unit 10 along with the caster wheels 20.

Each drill 11 has a hitch structure 24 that surrounds its caster wheels and extends forwardly thereof. Specifically, downwardly extending elements 25 and 26 are bolted to beams 21 and 22 respectively. Suitable supports are provided that extend rearwardly from the elements to the framework 12. Forwardly of element 25 are members 27 and 28 which with comparable members on the other side of wheels 20 are joined to connecting element 29 by suitable bolts. When not used in a multi-unit arrangement, further structure is provided that extends from element 29 to the tractor. However, this is eliminated when a multi-hitch arrangement 30 is utilized. In this case suitable reinforcements such as 31 are provided.

Multi-hitch 30 coordinates the hitch structure 24 of each of the four units for actuation by a single tractor having large dual wheels 31a shown (partially) in FIG. 2. Multi-hitch 30 has a generally triangular shaped tongue 32 that has an apex end adapted for connection to a tractor draw bar and the opposite ends constructed for pivotal attachment to a horizontal and transversely extending first main beam 33 which generally spans the caster wheels 20 of the two inner drills. Rearwardly spaced from beam 33 is a similar hollow square shaped second main beam 34 that extends between all of the unit hitches and is attached thereto by suitable top and bottom plates by bolts. Inward of the ends of the tongue, similar plates extend between beams 33 and 34 to provide reinforcement. Also, providing further reinforcement generally adjacent the legs of the tongue 32 are members 35, 36, 37, and 38 which are shown best in FIG. 2. These members are bolted to the frame 12 at one end and to the plates connecting beams 33 and 34 at the other end. The members are arranged in a triangular manner generally opposite the tongue structure. It is to be noted that in FIG. 1, the unit 10 is positioned for transport except for tongue 32. Tongue 32 would be positioned upwardly about the hitch support structure toward the unit before transport began to reduce unit width.

Obviously the unit 10 has considerable bulk thereby necessitating a large tractor to operate same for planting which results in large and compacted tractor tracks even though the caster wheels are offset therefrom. Also, the hitch support structure has to extend a substantial distance from the drills because of the front mounted caster wheels. Of course, it is desirable that this support structure, notwithstanding its design requirements, not be unduly heavy.

Applicant, therefore designed his track erasing devices 39 and 40, which are similar except generally for hand, for mounting on the limited hitch structure available rather than on the tractor or the even more limited structure of the two center drills. Further, remote control and an approximately 145° upward fold for safe transport and high clearance were desired.

Device 39, rather than device 40, will now be detailed. It generally achieves these requirements as will become clearly apparent. Device 39, as shown best in FIGS. 3 and 4, includes bracket 41.

Bracket 41 is designed to be mounted close to a pivotal connection of tongue 32 to beam 33 and extend laterally therefrom, hence, the opposite hand structure of the devices 39 and 40. Bracket 41 consists of base plate 42 having upstanding flanges 43 and 44. Flange 44 has upper portion 45 and downwardly extending portion 46. Via holes 48 in base plate 42, bracket 41 is attached to beams 33 and 34 by the bolts and nuts shown in FIG. 4. Also, a part of bracket 41 is bar 49 welded thereto with spaced cylinder supports 50 attached on opposing sides of bar 49 by bolts and nuts with spacers 51 maintaining a desired spacing. Each support 50 has an aligned upper opening 50a for rod 52 which extends therethrough and through flanges 43 and 44 and portion 46. Rod 52 is the main support of the clevis 54 at the cylinder end of double acting hydraulic cylinder 55. Clevis 54 is mounted between the supports 50. The supports 50 also have further openings for pin 57 which extends therethrough. A first pair of spaced links 58 are mounted on lower pin 57 on opposing ends with spacers 59 between the links and the supports. Links 58 are also mounted on upper pin 60 which extends between rod clevis 61 of cylinder 55. Spacers 62 on pin 60 separate the clevis legs from the links 58. Suitable pins maintain links 58 on pins 60 and 57. Also mounted on upper pin 60 is a second pair of spaced links 64, which are mounted adjacent links 58 and are also maintained in position by the aforesaid spacers and pins. Links 64 extend to the opposite side of cylinder 55 compared to links 58 and are mounted on shaft 65 against washers 66 which lie against removable pins extending through shaft 65.

Tool support structure 67 is pivotally mounted on rod 52 as is the cylinder clevis 54 of cylinder 55 adjacent flange 43 and portion 46. Structure 67 is also pivotally mounted on shaft 65 adjacent links 64 with spacers therebetween. Structure 67 consists of spaced arms 68 and 69 that are mounted on shaft 65 and rod 52 with suitable spacers between each pair of arms. Also a part of structure 67 are pairs of spaced supporting members 70 and 71 with members 70 being bolted to arm 68 with suitable spacers therebetween and members 71 being similarly connected to arms 69. Pivotally connected between members 70 by a suitable pin are elements 72. Similar elements 73 are similarly connected by pin 73a to members 71. Elements 72 and 73 extend generally toward the tractor and support transversely extending tubes 74 and 75 which via U-bolts and suitable nuts provide the mounting for the individual earth-working tools 78. Tool 78, as is conventional, consists of shank 79 attached to a tube by a clamp 80 by suitable fasteners. Individual point 81 is removably attached to a shank by a bolt and nut assembly. Shanks 79 are mounted on tubes 74 and 75 in staggered fashion as shown best in FIG. 2 to provide a spaced arrangement for erasing the tractor tracks.

Also, a part of device 39 is a tool levelling means 82 with a means located on each side of the device. Means 82 includes an upper trunnion 83 pivotally mounted in arms 68. Trunnion 83 does not have a threaded bore. Shaft 84 has handle 85 and also has an upper fixed washer that contacts the top of trunnion 83 and a pin secured threaded collar 85a below the trunnion. Shaft 84 can thus rotate in the trunnion but travel therethrough is prevented. The bottom portion of shaft 84 is threaded to engage an internal thread in threaded trunnion 86 that is pivotally mounted in elements 72. It is to be noted that trunnion 86 is located forward, toward the tractor, of pivot pins 73a (see FIG. 4) hence the need for trunnion type mountings. By rotation of handle 85 and that of the similar assembly attached to members 73, the position of elements 72 and 73 and thus the mounted tools relative to arms 68 and 69 can be varied to maintain same in a level position relative to the ground.

Also, to be noted is that a restrictor may be utilized in the clevis end of cylinder 55 to control the movement of the device by the cylinder between transport and the working position. Further a movable collar assembly 87 is provided which includes sleeve 87a threaded to the rod and collar 87b threaded to the sleeve to change the cylinder stroke to provide tool depth control.

In operation, with device 39 shown as in FIG. 1, the tools 78 are set at their maximum soil depth and in a level position for erasing a tractor track in advance of the grain drill. Should a lesser tool depth be desired, by actuation of a suitable valve, fluid will be directed to the based end of cylinder 55 to extend the rod to cause links 58 to pivot rearwardly about shaft 57 and links 64 to rotate arms 69 and thus move tool support structure 67 rearwardly about rod 52. When the desired depth has been reached, the movement can be stopped by moving the valve to a closed neutral position and then collar 87b threaded down sleeve 87a until it contacts the cylinder. This sets a shortened cylinder stroke position corresponding to the selected depth. Of course, due to the rotation of the structure 67, the tools thereon are not in a level position in relation to the soil. To achieve this the handle 85 of each leveling means 82 is turned counterclockwise to lower the arms 73 and 74 via threaded trunnions 86 and thus the tools to a level position. Contrary rotation of handles 85 would level the tools if the same were moved to a lower position. Once the stroke is adjusted, the same depth setting will be achieved when the device 39 is lowered by retracting the cylinder rod to the new retracted position.

Upon turn, or when endwise transport is desired by actuation of the valve, fluid will be directed to the base end of cylinder 55 to extend the rod fully, causing the support structure 67 to move about rod 52 to the broken line position shown in FIG. 4 which approximates a rotation of 145°. 180° movement is possible with slight modifications. An over center position is achieved. The tongue is then also pivoted upwardly and toward the drills. The rear transport wheels are lowered, and via the caster wheels 20, with the tractor attached to an auxiliary hitch at the drill end noted, the unit can now be moved in transport with a narrow overall clearance. A further caster wheel is customarily provided at the end of the train for ease in turning.

What is claimed is:

1. A track removing device comprising:
   a. a bracket adapted to be mounted on an implement hitch rearward of a tractor;
   b. a hydraulic cylinder having an end pivotally mounted on an axis on said bracket;
   c. a first link pivotally mounted on said bracket on one side of said cylinder and also pivotally connected to the extension end of said cylinder;
   d. a support structure mounted for rotation on said axis;
   e. a plurality of spaced soil working tools mounted on said structure;
   f. a second link pivotally mounted on said support structure on another side of said cylinder and also pivotally connected to the extension end of said cylinder, said cylinder, upon extension, rotating said structure about said axis to withdraw said tools from the soil and returning said tools to the soil upon retraction.

2. The device of claim 1 in which the length of the first and second links is greater than the cylinder length in the retracted cylinder position.

3. The device of claim 2 in which the length of the first link is the same as the length of the second link and both links are equally spaced on opposing sides of the cylinder.

4. The device of claim 3 further comprising means for varying the stroke length of the cylinder and thus the tool soil depths.

5. The device of claim 4 in which a pair of spaced first link and a pair of spaced second links are utilized.

6. The device of claim 5 in which said support structure is mounted for rotation on said axis on laterally opposing sides of said cylinder.

7. The device of claim 6 in which said support structure comprises a pair of spaced arms mounted on each end of said axis and supporting members mounted on said arms and having a tool support element pivotally attached to said supporting members.

8. The device of claim 7 further comprising tool levelling means extending between said arms and said tool support element.

9. The device of claim 8 in which said tool levelling means comprises a trunnion rotatably located in each arm and a threaded trunnion rotatably mounted in said tool support element and a shaft rotatably mounted in said trunnion and having a thread for engaging said threaded trunnion to raise and lower said support element.

10. The device of claim 9 in which said tool support element further comprises a pair of transversely extending spaced tubes and said tools are mounted on said tubes in a staggered arrangement between and beyond said arms.

* * * * *